US012289816B2

(12) United States Patent
Tang et al.

(10) Patent No.: US 12,289,816 B2
(45) Date of Patent: Apr. 29, 2025

(54) METHOD FOR IMPROVING UNIFORMITY OF ELECTROMAGNETIC FIELD INSIDE STATIC MICROWAVE RESONANT CAVITY

(71) Applicant: HUNAN UNIVERSITY, Changsha (CN)

(72) Inventors: Zhixiang Tang, Changsha (CN); Yixuan Zeng, Changsha (CN); Yi Liu, Changsha (CN); Yijia Xia, Changsha (CN); Yuqing Ling, Changsha (CN)

(73) Assignee: HUNAN UNIVERSITY, Changsha (CN)

( * ) Notice: Subject to any disclaimer, the term of this patent is extended or adjusted under 35 U.S.C. 154(b) by 0 days.

(21) Appl. No.: 18/852,514

(22) PCT Filed: Apr. 4, 2023

(86) PCT No.: PCT/CN2023/086079
§ 371 (c)(1),
(2) Date: Sep. 30, 2024

(87) PCT Pub. No.: WO2023/193693
PCT Pub. Date: Oct. 12, 2023

(65) Prior Publication Data
US 2025/0106956 A1 Mar. 27, 2025

(30) Foreign Application Priority Data
Apr. 7, 2022 (CN) ........................ 202210361018.9

(51) Int. Cl.
*H05B 6/64* (2006.01)
*H05B 6/70* (2006.01)
*H05B 6/80* (2006.01)

(52) U.S. Cl.
CPC ............. *H05B 6/6402* (2013.01); *H05B 6/80* (2013.01)

(58) Field of Classification Search
CPC ........ H05B 6/80; H05B 6/6402; H05B 6/666; H05B 56/647; H05B 6/705
(Continued)

(56) References Cited

U.S. PATENT DOCUMENTS 9,078,298 B2 * 7/2015 Ben-Shmuel .......... H05B 6/647
2006/0102622 A1 * 5/2006 Gregoire ................. H05B 6/70 219/695

FOREIGN PATENT DOCUMENTS

CN 107104262 A 8/2017
CN 111817012 A 10/2020
(Continued)

*Primary Examiner* — Quang T Van
(74) *Attorney, Agent, or Firm* — Bayramoglu Law Offices LLC

(57) ABSTRACT

A method for improving uniformity of an electromagnetic field inside a static microwave resonant cavity is provided. The overlap between a nodal point in one mode and an antinodal point in another node inside a microwave resonant cavity is realized by using two different types of anisotropic media, thereby improving distribution uniformity of an electromagnetic field inside a static resonant cavity. The method can reduce the complexity of cavity mechanisms of a microwave oven having a turntable and a flat panel microwave having an electromagnetic stirrer and improve static microwave treatment uniformity, thereby promoting the application of high-temperature and high-power microwave treatment in the fields such as microwave sintering, microwave smelting, and microwave chemical industry.

20 Claims, 10 Drawing Sheets

(58) Field of Classification Search
USPC ....... 219/750, 745, 746, 747, 756, 760, 761, 219/695
See application file for complete search history.

(56) References Cited

FOREIGN PATENT DOCUMENTS

| | | | |
|---|---|---|---|
| CN | 114666932 | A | 6/2022 |
| WO | 2017081855 | A1 | 5/2017 |

* cited by examiner

METHOD FOR IMPROVING UNIFORMITY OF ELECTROMAGNETIC FIELD INSIDE STATIC MICROWAVE RESONANT CAVITY

CROSS REFERENCE TO THE RELATED APPLICATIONS

This application is the national phase entry of International Application No. PCT/CN2023/086079, filed on Apr. 4, 2023, which is based upon and claims priority to Chinese Patent Application No. 202210361018.9, filed on Apr. 7, 2022, the entire contents of which are incorporated herein by reference.

TECHNICAL FIELD

The present disclosure relates to the technical field of microwaves, and in particular, to a method for improving uniformity of an electromagnetic field inside a static microwave resonant cavity.

BACKGROUND

Microwave treatment, such as microwave sterilization and disinfection, microwave insecticidal treatment, microwave heating, and microwave drying, has many advantages such as high efficiency, high speed, energy conservation, and overall treatment, and has been widely applied to fields such as industry, agriculture, medical treatment, and food processing.

To prevent electromagnetic pollution and electromagnetic interference caused by microwave leakage, microwave treatment is usually performed in a metal cavity. Spatial distribution of electromagnetic power in a resonant mode of an electromagnetic field inside a microwave cavity is non-uniform, which leads to some materials being over-treated (for example, overheated), but some materials still being under-treated (for example, unheated), so that the promotion and application of microwave treatment in more fields are greatly limited. How to effectively improve microwave treatment uniformity has become an important subject in application and promotion of microwave energy.

SUMMARY

Technical Problem

There are mainly two methods for improving microwave treatment uniformity from a perspective of microwave cavities. One is to arrange a rotating load tray inside a microwave cavity. This method is one of the simplest and most effective methods for improving the microwave treatment uniformity nowadays. However, this solution often leads to over-treatment or under-treatment at a central position of a turntable due to a fixed rotation axis. Although a combined rotating tray may enrich spatial motion trajectories of treated materials and solve the problem of over-treatment or under-treatment in the center of the turntable, a structure of the combined rotating tray is too complex. Moreover, this rotating load tray, particularly, the combined rotating tray does not facilitate cleaning an interior of a cavity. The other is a panel microwave cavity. A moving part (namely, an electromagnetic stirrer) of this cavity is isolated by a ceramic plate, and there is no moving part in the cavity, so that the problems of inconvenience in cleaning the interior of the cavity caused by the rotating tray are solved. In this panel cavity, a heated material is placed in the cavity. The heating uniformity of the heated material mainly depends on the stirring capacity of the electromagnetic stirrer to the modes in the cavity and complementarity of spatial distribution of electromagnetic fields in various modes. However, the uniformity of most panel microwave cavities on the market is not as good as that of rotating tray type microwave cavities nowadays. Although this microwave resonant cavity with an object moving in the cavity is beneficial to improving the microwave treatment uniformity, the complexity of cavity mechanisms is increased, and some requirements such as high temperature stability, transparent to the microwaves are put forward for the material of the moving object. Therefore, most high-temperature and ultra-high temperature industrial microwave ovens and kilns adopt static microwave cavities (without moving objects stirring intra-cavity electromagnetic fields in the cavities), resulting in severe microwave heating non-uniformity and even often leading to thermal runaway.

In addition, the microwave treatment uniformity can alternatively be improved from a perspective of microwave sources. Electromagnetic wave modes at different frequencies in the same cavity have different spatial power distribution. The microwave treatment uniformity can alternatively be effectively improved by reasonably using a broadband microwave source or multiple microwave sources with different working frequencies to excite a microwave cavity. However, there is no doubt that the cost of microwave treatment equipment is greatly increased by using the broadband microwave source (which is expensive) or the multiple microwave sources with different working frequencies.

A traditional static microwave resonant cavity does not have a moving object or other manners to change a working state of the microwave cavity, the working mode is single, and a nodal point and an antinodal point in a standing wave field in the cavity are fixed, resulting in non-uniformity of electromagnetic power density distribution and microwave treatment in the cavity. Therefore, a method for improving uniformity of an electromagnetic field inside a static microwave resonant cavity is of great value in reducing the complexity of cavity mechanisms and improving static microwave treatment uniformity, thereby promoting the application of high-temperature and high-power microwave treatment in the fields such as microwave sintering, microwave smelting, and microwave chemical industry.

Artificial electromagnetic materials, alternatively referred to as electromagnetic metamaterials, are artificially designed microstructured electromagnetic materials designed for specific working wavelength, which can achieve many electromagnetic properties that natural materials do not have in this wavelength band, such as negative refraction and photon bandgap. The electromagnetic metamaterials have been widely applied to the fields such as antenna design and optical field manipulation due to their unique electromagnetic properties.

Technical Solution

For the problem of poor microwave treatment uniformity in an existing static microwave cavity, an objective of the present disclosure is to provide a method for improving uniformity of an electromagnetic field inside a static microwave resonant cavity to reduce the complexity of cavity mechanisms of a microwave oven having a turntable and a flat panel microwave having an electromagnetic stirrer and improve static microwave treatment uniformity, thereby promoting the application of high-temperature and high-power microwave treatment in the fields such as microwave sintering, microwave smelting, and microwave chemical industry.

To achieve the above objective, the technical solution of the present disclosure is as follows:

A method for improving uniformity of an electromagnetic field inside a static microwave resonant cavity includes the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction to be consistent, and enabling waveguide with the same dimensions as those of an adjusted resonant cavity in the u-direction and the v-direction to have guided modes polarized in the u-direction and polarized in the v-direction;

step 2, selecting two different types of anisotropic media, so that the phase difference between electromagnetic waves polarized along two orthogonal directions of u and v in the resonant cavity after being totally reflected by the two types of anisotropic media is $\Delta\varphi_{uv}=(2q+1)\pi$, that is, the difference between numbers of standing waves of two orthogonal modes along the z-direction is an odd number 2q+1, where q is an integer; and step 3, respectively arranging the two types of anisotropic media on two inner walls in the z-direction inside the resonant cavity, and setting a distance between the two types of anisotropic media to enable the resonant cavity to work in two orthogonal modes or two degenerate modes, so that a nodal point or an antinodal point of one mode in the z-direction inside the resonant cavity is exactly the antinodal point or the nodal point in the other mode, thereby improving uniformity of an electromagnetic field.

A method for improving uniformity of an electromagnetic field inside a static microwave resonant cavity includes the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium and a second anisotropic medium that are different from each other, so that the phase difference between electromagnetic waves polarized along two orthogonal directions of u and v in the resonant cavity after transmitting through the two types of anisotropic media is $\Delta\varphi_{uv}=\beta_{u1}d_1+\beta_{u2}d_2-\beta_{v1}d_1+\beta_{v2}d_2$, where $d_1$ and $d_2$ are thicknesses of the two types of anisotropic media, $\beta_{u1}$ and $\beta_{u2}$ are respectively phase constants of a TE wave or a TM wave (an electric field or a magnetic field polarized along the u-direction) in the waveguide with the same dimension as that of the resonant cavity in the u-direction is filled with the first anisotropic medium and the second anisotropic medium, and $\beta_{v1}$ and $\beta_{v2}$ are phase constants in the v-direction under the same condition; and step 3, respectively arranging the two types of anisotropic media on two inner walls in the z-direction inside the resonant cavity, and setting a distance between the two types of anisotropic media to enable the resonant cavity to work in two orthogonal modes or two degenerate modes, so that a nodal point or an antinodal point of one mode in the z-direction inside the resonant cavity is exactly the antinodal point or the nodal point in the other mode, thereby improving uniformity of an electromagnetic field.

A method for improving uniformity of an electromagnetic field inside a static microwave resonant cavity includes the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium, so that the phase difference between a TE wave or a TM wave (an electric field or a magnetic field polarized along the two orthogonal directions of u and v) in the resonant cavity after being totally reflected by the first anisotropic medium with a thickness of 2d is $\Delta\varphi_{uv}=(2q+1)\pi$, where q is an integer; and rotating the first anisotropic medium around a z-axis by 90° as a second anisotropic medium, that is, the major axis direction of the index ellipsoid of the first anisotropic medium being consistent with the short axis direction of the second anisotropic medium; and step 3, respectively arranging the two types of anisotropic media with a thickness of d on two inner walls in the z-direction inside the resonant cavity, enabling the major axis direction of the index ellipsoid of one anisotropic medium to be consistent with the u-direction, enabling the major axis direction of the index ellipsoid of the other anisotropic medium to be consistent with the v-direction, and setting a distance between the two types of anisotropic media to enable the resonant cavity to work in two orthogonal modes or two degenerate modes, so that a nodal point or an antinodal point of one mode in the z-direction inside the resonant cavity is exactly the antinodal point or the nodal point in the other mode, thereby improving uniformity of an electromagnetic field.

A method for improving uniformity of an electromagnetic field inside a static microwave resonant cavity includes the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium, so that the phase difference of a TE wave or a TM wave (an electric field or a magnetic field polarized along the two orthogonal directions of u and v) in the resonant cavity after passing through the first anisotropic medium with a thickness of 2d is $\Delta\varphi_{uv}=2d\beta_u-2d\beta_v$, where q is an integer, Bu is a phase constant of the TE wave or the TM wave (the electric field or the magnetic field polarized along the u-direction) in the waveguide with the same dimension as that of the adjusted resonant cavity in the u-direction is filled with the first anisotropic medium, and $\beta_v$ is a corresponding phase constant in the v-direction; and rotating the first anisotropic medium around a z-axis by 90° as a second anisotropic medium, that is, the major axis direction of the index ellipsoid of the first anisotropic medium being consistent with the short axis direction of the second anisotropic medium; and step 3, respectively arranging the two types of anisotropic media on two inner walls in the z-direction inside the resonant cavity, enabling the major axis direction of the index ellipsoid of one anisotropic medium to be consistent with the u-direction, enabling the major axis direction of the index ellipsoid of the other anisotropic medium to be consistent with the v-direction, and setting a distance between the two types of anisotropic media to enable the resonant cavity to work in two orthogonal modes or two degenerate modes, so that a nodal point or an antinodal point of one mode in the z-direction inside the resonant cavity is exactly the antinodal point or the nodal point in the other mode, thereby improving uniformity of an electromagnetic field.

According to the method, in step 1, the direction with the most non-uniform electromagnetic field distribution of three orthogonal directions refers to a direction with a largest number of standing waves or densest standing waves.

According to the method, in step 1, the two guided modes polarized in the u-direction and the v-direction of the waveguide with the same dimensions as those of the resonant cavity in the u-direction and the v-direction have the same phase constant β, that is, the two guided modes degenerate.

According to the method, in step 2, the two types of anisotropic media are arranged inside the resonant cavity perpendicular to and intersecting with each other; and then, electromagnetic waves are emitted to an interior of the resonant cavity from end portions of the two types of anisotropic media, and the phase difference $\Delta\varphi_{uv}$ between the electromagnetic waves in the two orthogonal directions of u and v is detected.

According to the method, in step 2, the first anisotropic medium is arranged inside the resonant cavity, then electromagnetic waves are emitted to an interior of the resonant cavity from an end portion of each anisotropic medium, and the phase difference $\Delta\varphi_{uv}$ between the electromagnetic waves in the two orthogonal directions of u and v is detected.

According to the method, step 3 further includes setting a polarization direction of a feed source of the resonant cavity on an angle bisector of the u-direction and the v-direction, or arranging two feed sources outside the two inner walls, provided with the media, to effectively excite the two orthogonal modes in which the nodal point in one mode is misaligned with the antinodal point in the other mode in the z-direction inside the cavity.

Beneficial Effect

The present disclosure has the beneficial effects that a method is provided to realize overlap between a nodal point in one mode and an antinodal point in another node inside a microwave resonant cavity by using two different types of anisotropic media, thereby improving distribution uniformity of an electromagnetic field inside a static resonant cavity. The present disclosure can reduce the complexity of cavity mechanisms of a microwave oven having a turntable and a flat panel microwave having an electromagnetic stirrer and improve static microwave treatment uniformity, thereby promoting the application of high-temperature and high-power microwave treatment in the fields such as microwave sintering, microwave smelting, and microwave chemical industry.

DETAILED DESCRIPTION OF THE EMBODIMENTS

Figure 1:
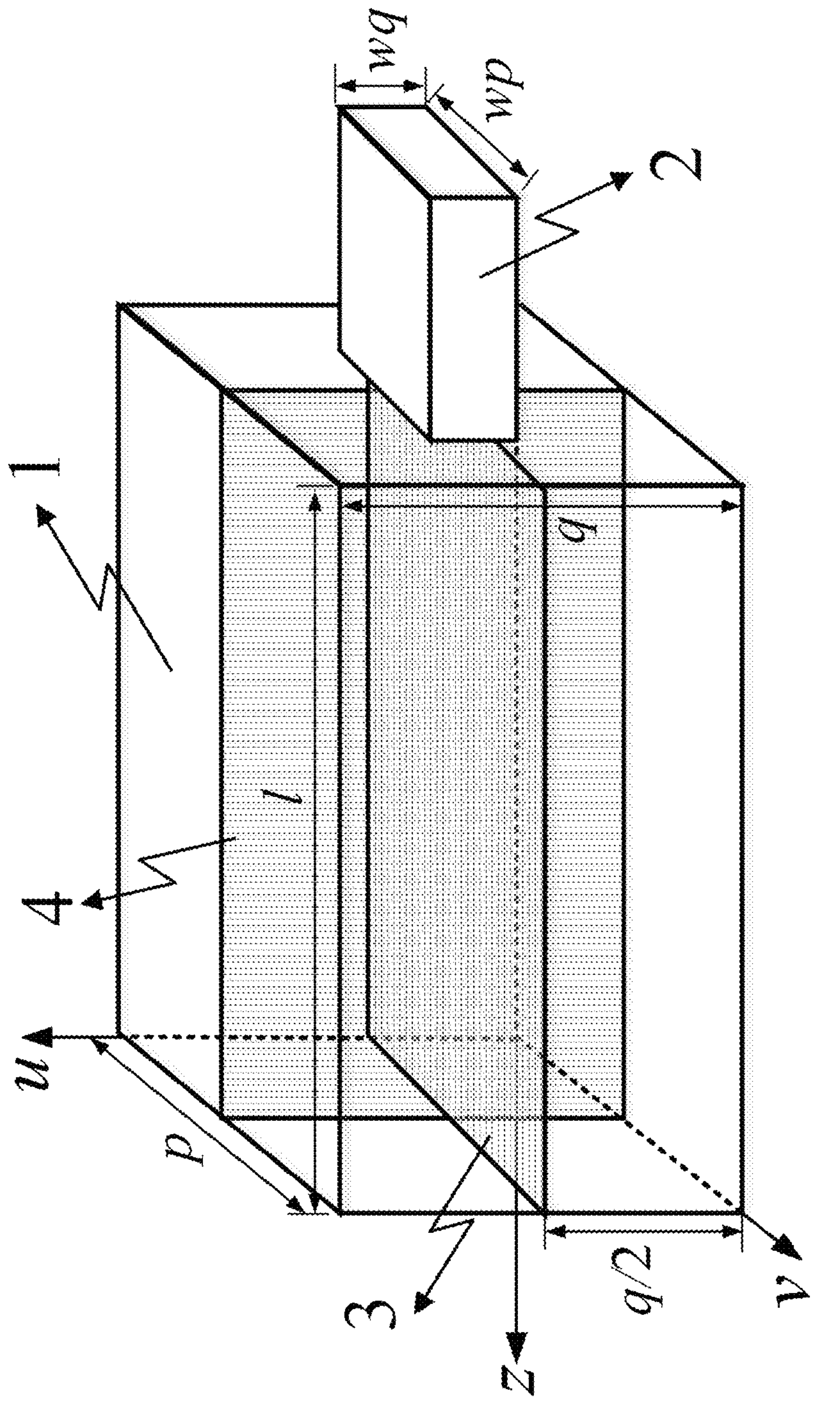
FIG. 1 is a schematic diagram of a three-dimensional structure of a static microwave resonant cavity to be improved in an embodiment of the present disclosure.

To describe embodiments of the present disclosure more clearly, technical solutions in the embodiments of the present disclosure will be clearly and completely described below with reference to accompanying drawings in the embodiments of the present disclosure. Apparently, the described embodiments are only part rather than all embodiments of the present disclosure. Based on the embodiments of the present disclosure, all other embodiments obtained by those of ordinary skill in the art without creative efforts fall within the scope of protection of the present disclosure.

A method for improving uniformity of an electromagnetic field inside a static microwave resonant cavity proposed in the present disclosure includes the following steps:

In step 1, electromagnetic field distribution inside a cavity is obtained through simulation or experimental measurement, a working mode inside the cavity is determined, and a direction with a largest number of standing waves or densest standing waves of three orthogonal directions of a resonant cavity, that is, a direction with the most non-uniform electromagnetic field distribution, is selected as a direction to be improved and is denoted as a z-direction. Another two orthogonal directions are respectively denoted as a u-direction and a v-direction, and dimensions of the resonant cavity in the u-direction and the v-direction are properly adjusted, so that waveguide with the same dimensions as those of an adjusted resonant cavity in the u-direction and the v-direction has guided modes polarized in the u-direction and polarized in the v-direction, that is, the two guided modes polarized in the u-direction and the v-direction have the same phase constant β, that is, the two guided modes degenerate.

In step 2, anisotropic media are selected. The anisotropic media include, but are not limited to, various materials including an anisotropic electromagnetic metamaterial. Here, a first manner is to select two different types of anisotropic media, that is, a first anisotropic medium and a second anisotropic medium, so that the phase difference between electromagnetic waves polarized along two orthogonal directions of u and v in the resonant cavity after being totally reflected by the two types of anisotropic media is $\Delta\varphi_{uv}=(2q+1)\pi$, that is, the difference between numbers of standing waves of two orthogonal modes along the z-direction is an odd number 2q+1, where q is an integer.

A second manner is to select two different types of anisotropic media, that is, a first anisotropic medium and a second anisotropic medium, so that the phase difference between electromagnetic waves polarized along two orthogonal directions of u and v in the resonant cavity after transmitting through the two types of anisotropic media is $\Delta\varphi_{uv}=\beta_{u1}d_1+\beta_{u2}d_2-B_{v1}d_1+B_{v2}d_2$, where $d_1$ and $d_2$ are thicknesses of the two types of anisotropic media, $\beta_{u1}$ and $\beta_{u2}$ are respectively phase constants of a TE wave or a TM wave (an electric field or a magnetic field polarized along the u-direction) in the waveguide with the same dimension as that of the resonant cavity in the u-direction is filled with the first anisotropic medium and the second anisotropic medium, and $\beta_{v1}$ and $\beta_{v2}$ are phase constants in the v-direction under the same condition.

When the phase difference $\Delta\varphi_{uv}$ between the electromagnetic waves in the two orthogonal directions of u and v is detected, the two types of anisotropic media selected in the above two manners are arranged inside the resonant cavity perpendicular to and intersecting with each other, and then electromagnetic waves are emitted to an interior of the resonant cavity from end portions of the two types of anisotropic media.

A third manner is to select an anisotropic medium as a first anisotropic medium, so that the phase difference between a TE wave or a TM wave (an electric field or a magnetic field polarized along the two orthogonal directions of u and v) in the resonant cavity after being totally reflected by the first anisotropic medium with a thickness of 2d is $\Delta\varphi_{uv}=(2q+1)\pi$, where q is an integer; and the first anisotropic medium is rotated around a z-axis by 90° as a second anisotropic medium, that is, the major axis direction of the index ellipsoid of the first anisotropic medium is consistent with the short axis direction of the second anisotropic medium.

A fourth manner is to select an anisotropic medium as a first anisotropic medium, so that the phase difference between a TE wave or a TM wave (an electric field or a magnetic field polarized along the two orthogonal directions of u and v) in the resonant cavity after passing through the first anisotropic medium with a thickness of 2d is $\Delta\varphi_{uv}=2d\beta_u-2d\beta_v$, where q is an integer, $\beta_u$ is a phase constant of the TE wave or the TM wave (an electric field or a magnetic field polarized along the u-direction) in the waveguide with the same dimension as that of the resonant cavity in the u-direction is filled with the first anisotropic medium, and $\beta_v$ is a corresponding phase constant in the v-direction; and the first anisotropic medium is rotated around a z-axis by 90° as a second anisotropic medium, that is, the major axis direction of the index ellipsoid of the first anisotropic medium is consistent with the short axis direction of the second anisotropic medium.

For the anisotropic media selected in the third and fourth manners, when the phase difference $\Delta\varphi_{uv}$ of the electromagnetic waves polarized in the two orthogonal directions of u and v is detected, the first anisotropic medium is arranged inside the resonant cavity, and then electromagnetic waves are emitted to an interior of the resonant cavity from an end portion of each anisotropic medium, and the phase difference $\Delta\varphi_{uv}$ between the electromagnetic waves polarized in the two orthogonal directions of u and v is detected.

In step 3, the two types of anisotropic media obtained in the first manner and the second manner in step 2 are arranged on two inner walls in the z-direction inside the resonant cavity, and a distance between the two types of anisotropic media is set to enable the resonant cavity to work in two orthogonal modes or two degenerate modes, while the two types of anisotropic media will lead to misalignment of the two orthogonal modes in a z-direction standing wave field, so that a nodal point or an antinodal point of one mode in the z-direction inside the resonant cavity is exactly the antinodal point or the nodal point in the other mode, thereby improving uniformity of an electromagnetic field.

If the two types of anisotropic media obtained in the third manner and the fourth manner in step 2 are used, the two types of anisotropic media with a thickness of d are respectively arranged on two inner walls in the z-direction inside the resonant cavity, the major axis direction of the index ellipsoid of one anisotropic medium is enabled to be consistent with the u-direction, the major axis direction of the index ellipsoid of the other anisotropic medium is enabled to be consistent with the v-direction, and a distance between the two types of anisotropic media is set to enable the resonant cavity to work in two orthogonal modes or two degenerate modes, while the two types of anisotropic media will lead to misalignment of the two orthogonal modes in a z-direction standing wave field, so that a nodal point or an antinodal point of one mode in the z-direction inside the resonant cavity is exactly the antinodal point or the nodal point in the other mode, thereby improving uniformity of an electromagnetic field.

Meanwhile, to further efficiently excite the two orthogonal modes in which a nodal point in one mode and an antinodal point in the other mode in the z-direction in the cavity are misaligned, a polarization direction of a feed source of the resonant cavity may alternatively be set on an angle bisector of the u-direction and the v-direction, or two feed sources may be arranged outside the two inner walls to excite the two orthogonal modes separately.

Figure 2:
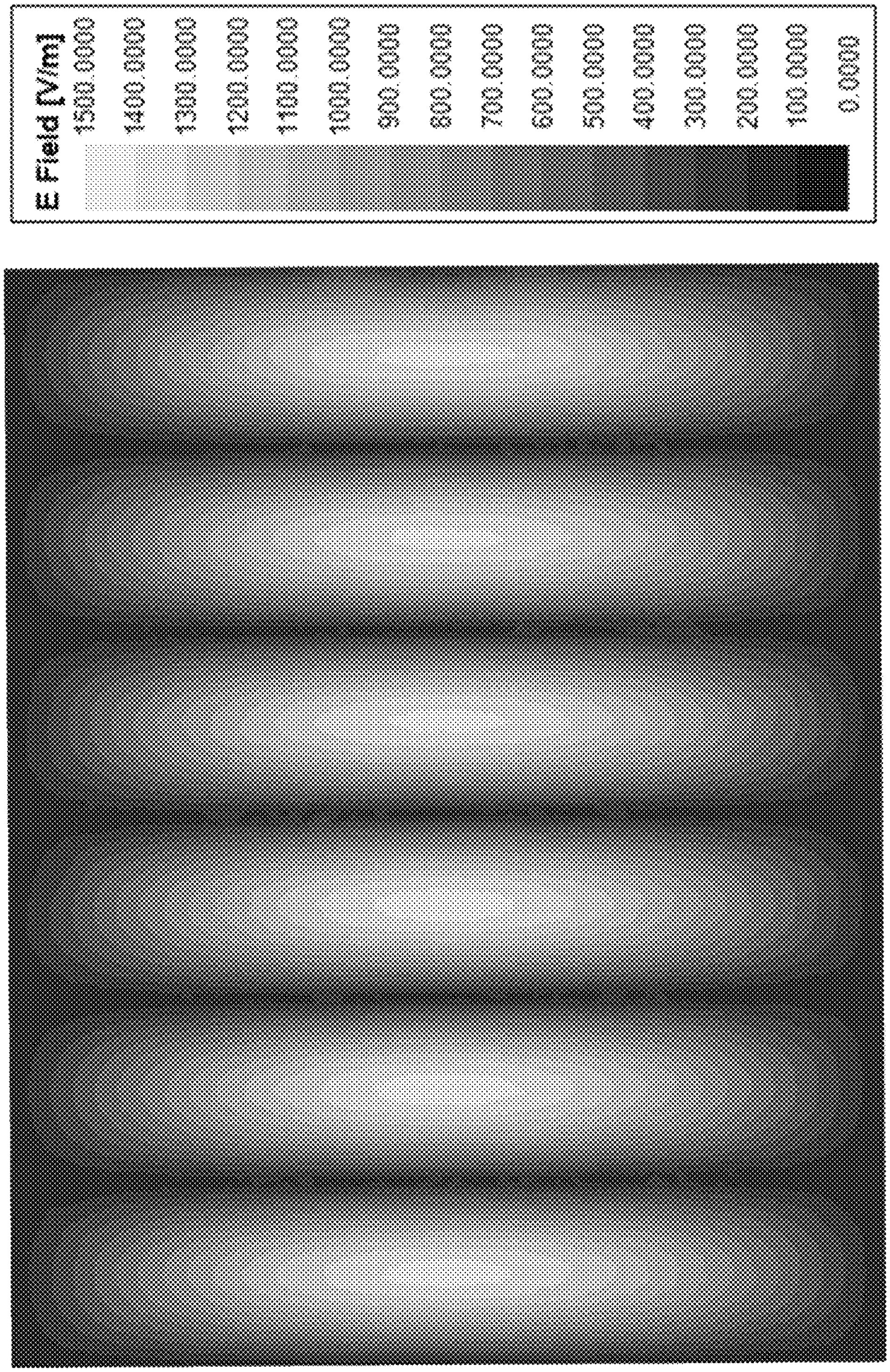
FIG. 2 is a field intensity distribution diagram of a static microwave resonant cavity to be improved in an embodiment of the present disclosure in a horizontal plane 3.
Figure 3:
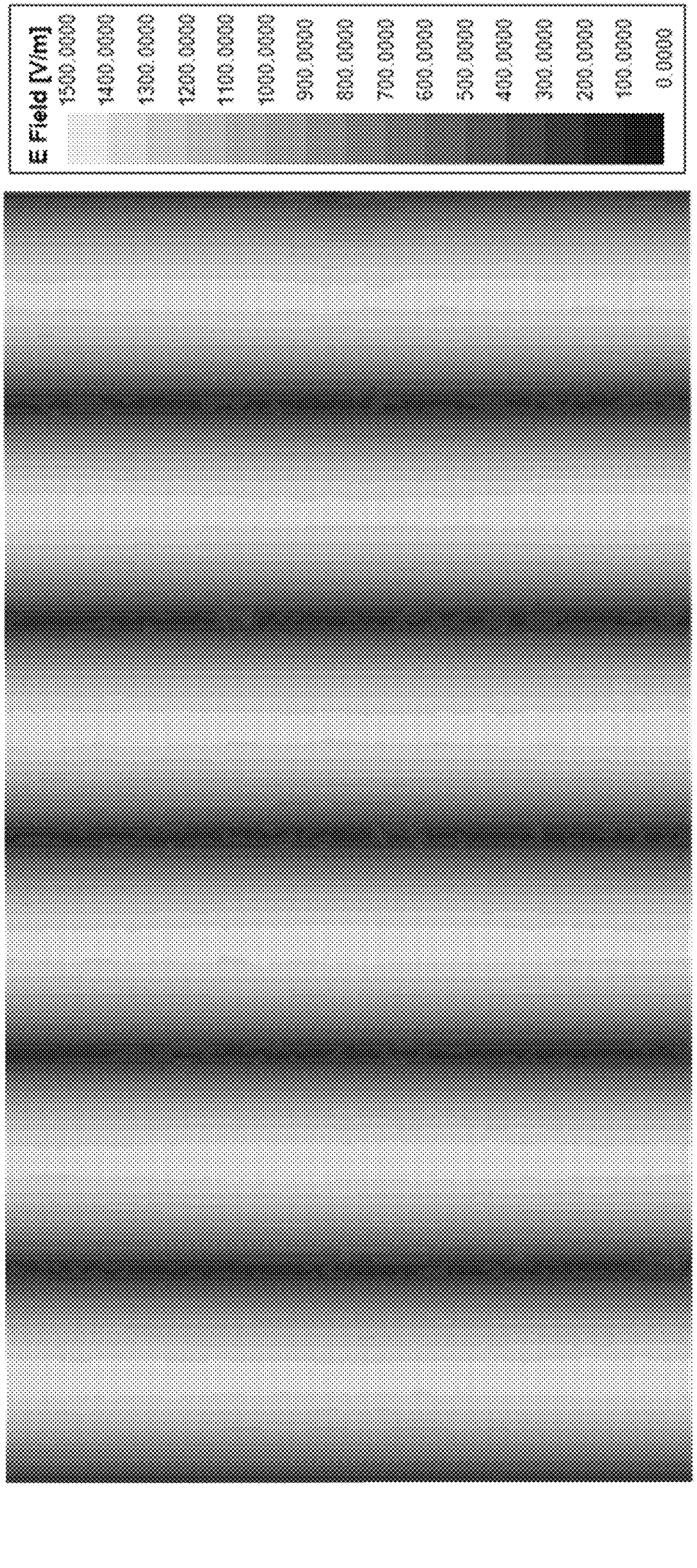
FIG. 3 is a field intensity distribution diagram of a static microwave resonant cavity to be improved in an embodiment of the present disclosure in a horizontal plane 4.

The following further describes by taking an embodiment for improving uniformity of an electromagnetic field inside a rectangular microwave cavity working in a $TE_{106}$ mode. As shown in FIG. 1, a rectangular microwave cavity 1 has a working frequency of 2.45 GHz and has cavity dimensions of p=300 mm, q=200 mm, and l=375 mm. A microwave source is fed from rectangular waveguide 2, and a transverse dimension of the rectangular waveguide is wp×wq=86.4 mm×18 mm. The resonant cavity works in the $TE_{106}$ mode, and field distribution of the resonant cavity in a transverse section 3 and a longitudinal section 4 are shown in FIG. 2 and FIG. 3. Apparently, the electromagnetic field in the cavity is uniform in a q side length direction, there is a standing wave in a p side length direction, and there are six standing waves in an l side length direction. Steps for improving uniformity of the electromagnetic field inside a static rectangular microwave cavity are as follows:

In step 1, according to the electromagnetic field distribution in the cavity shown in FIG. 2 and FIG. 3, the static rectangular microwave cavity works in the $TE_{106}$ mode, a direction with a largest number of standing waves or densest standing waves, that is, the l side length direction, is selected as a direction to be improved and is denoted as a z-direction, and another two orthogonal directions are respectively denoted as a u-direction and a v-direction. The electromagnetic field distribution in the cavity in the u and v directions is uniform. The dimension of the resonant cavity in the u direction is adjusted as q=p=300 mm. The waveguide (p×q=300 mm×300 mm) with the same dimensions as those of the resonant cavity in the directions u and v have guided modes polarized in the u-direction and the v-direction, that is, the $TE_{10}$ mode and the $TE_{01}$ mode. Moreover, these two modes are degenerate modes.

In step 2, a layered anisotropic metamaterial with $\varepsilon_{uu}=\varepsilon_{zz}=1.5$ and $\varepsilon_{vv}=4.2$ is selected as a first anisotropic medium, the first anisotropic medium is rotated around a z-axis by 90° as a second anisotropic medium (dielectric parameters $\varepsilon_{vv}=\varepsilon_{zz}=1.5$ and $\varepsilon_{uu}=4.2$). When the two anisotropic media have the thickness of d=33.5 mm, the phase difference between TE waves (electric fields polarized along the two orthogonal directions of u and v) in the resonant cavity after passing through the anisotropic medium with a thickness of 2d is $\Delta\varphi_{uv}=(\beta_u-\beta_v)\times 2d=\pi$, that is, a difference between numbers of standing waves of two orthogonal and degenerate modes in two pieces of the first anisotropic media is an odd number; and the first anisotropic medium is rotated around a z-axis by 90° as a second anisotropic medium (after rotating, the major axis direction of the index ellipsoid of the first anisotropic medium is consistent with the short axis direction of the second anisotropic medium).

Figure 4:
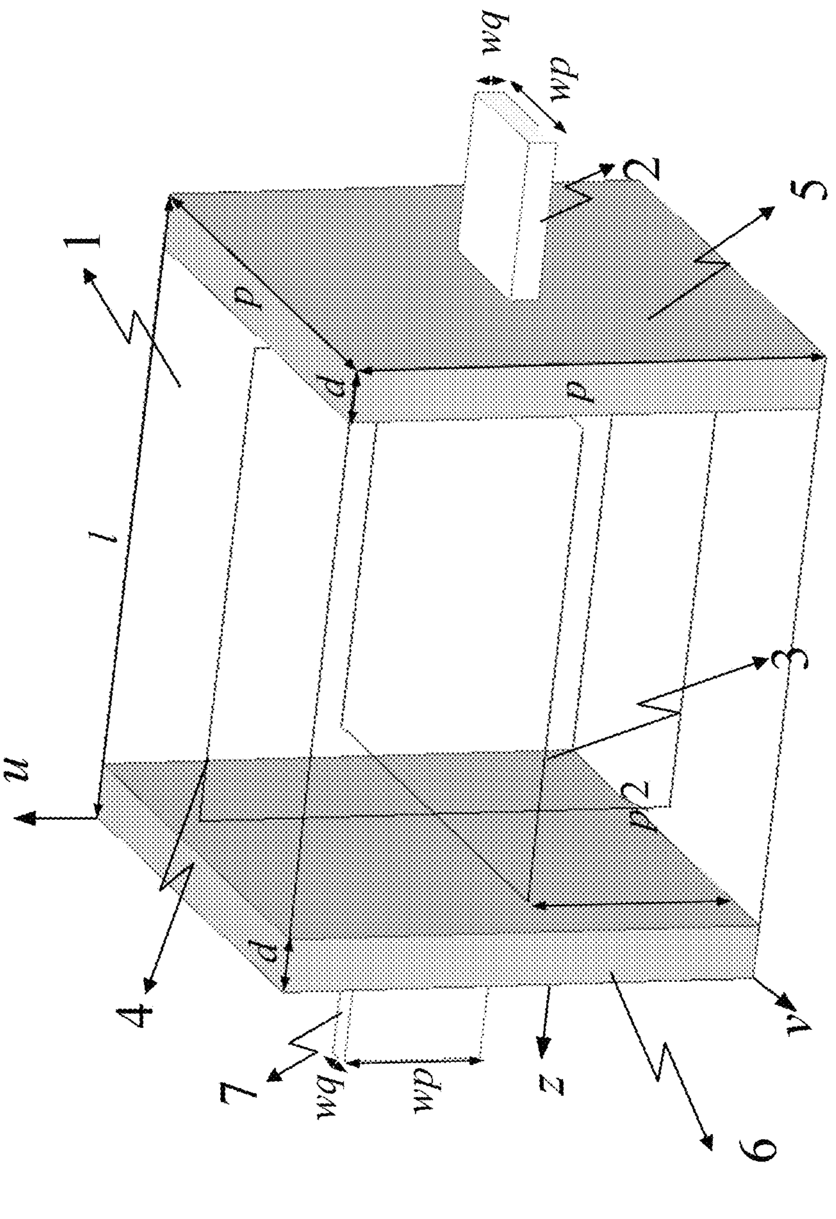
FIG. 4 is a schematic diagram of a three-dimensional structure of a static microwave resonant cavity shown in FIG. 1 after improvement in an embodiment of the present disclosure.
Figure 5:
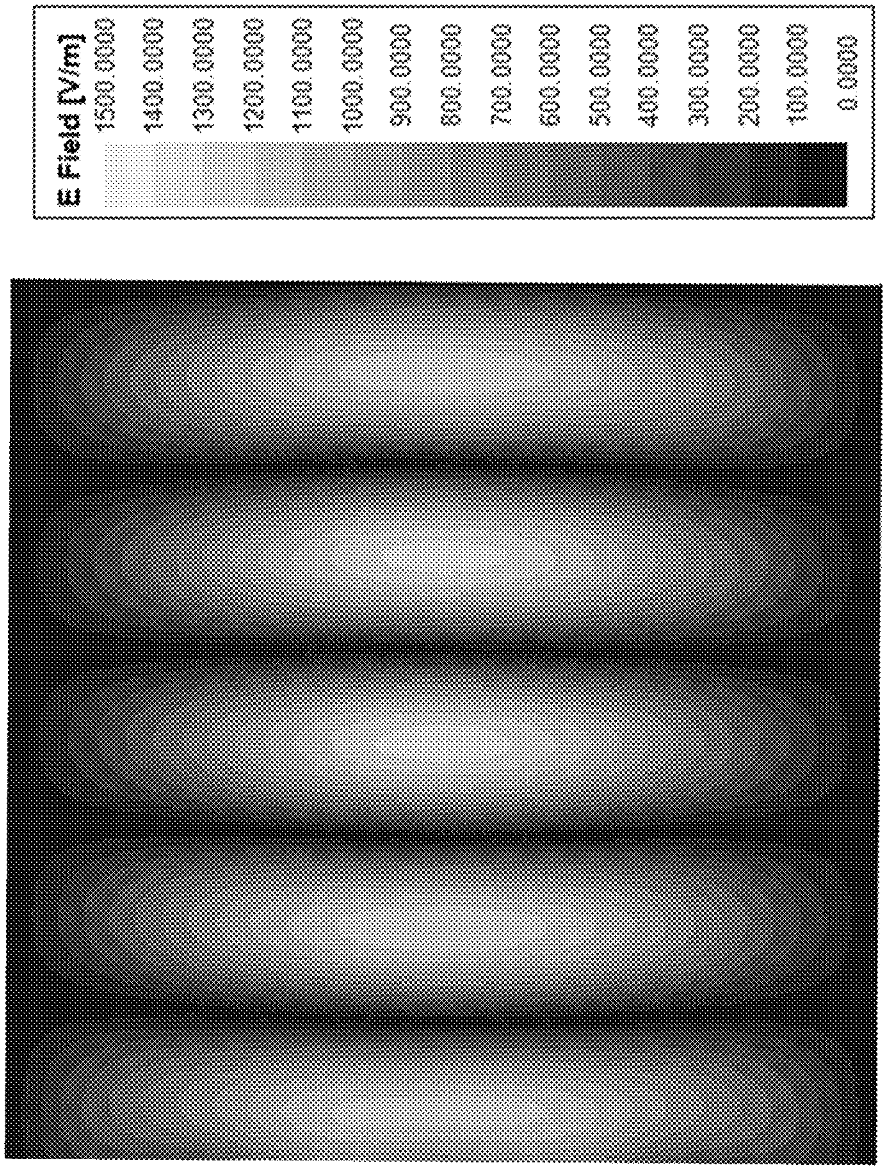
FIG. 5 is a field intensity distribution diagram of a horizontal plane 3 when only a first waveguide excitation source 2 works after a static microwave resonant cavity is improved in an embodiment of the present disclosure.
Figure 6:
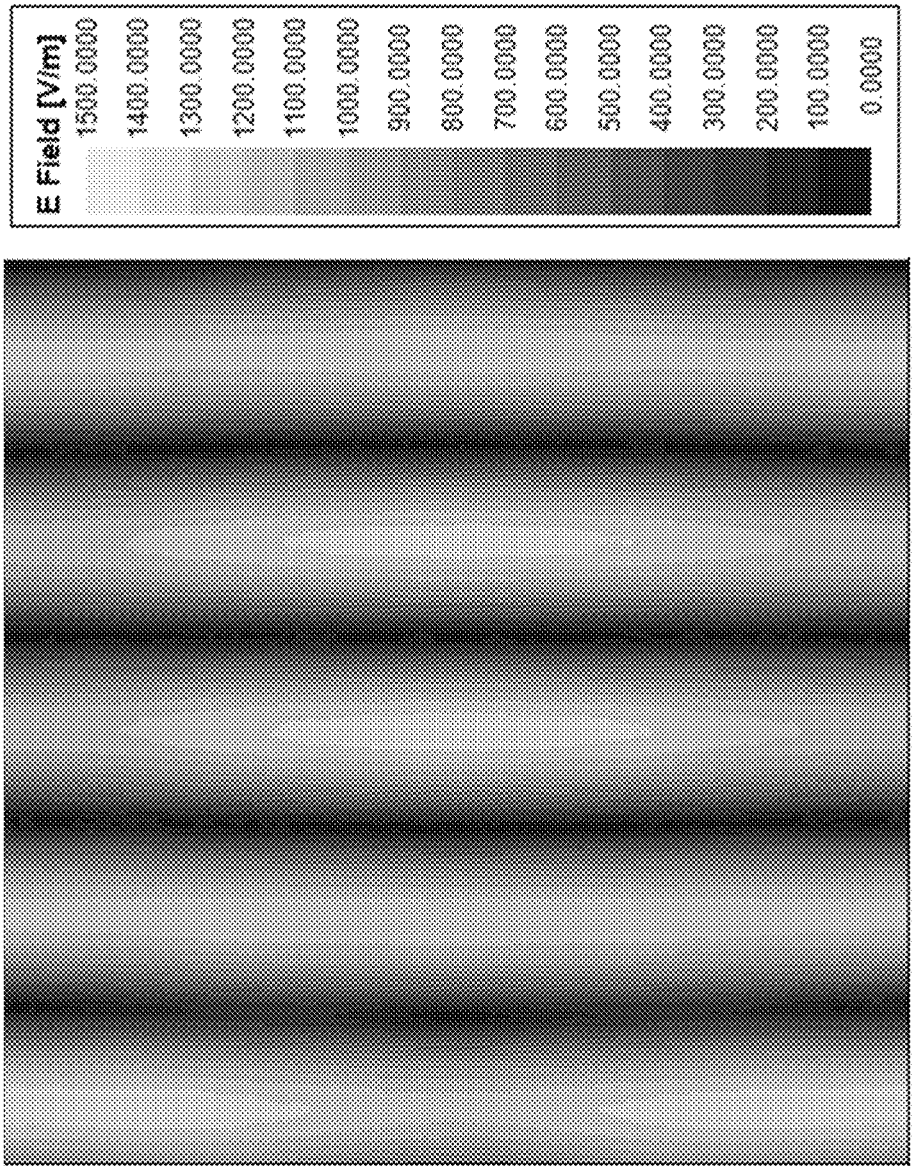
FIG. 6 is a field intensity distribution diagram of a vertical plane 4 when only a first waveguide excitation source 2 works after a static microwave resonant cavity is improved in an embodiment of the present disclosure.
Figure 7:
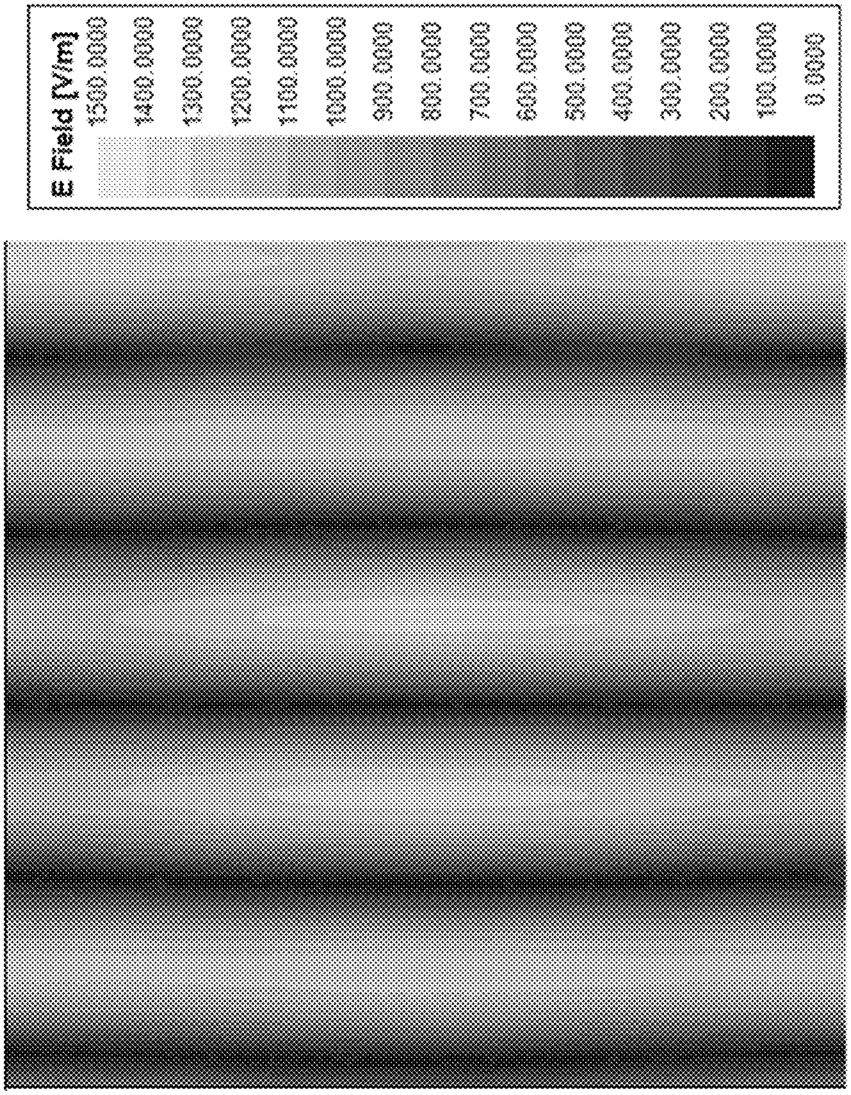
FIG. 7 is a field intensity distribution diagram of a horizontal plane 3 when only a second waveguide excitation source 7 works after a static microwave resonant cavity is improved in an embodiment of the present disclosure.
Figure 8:
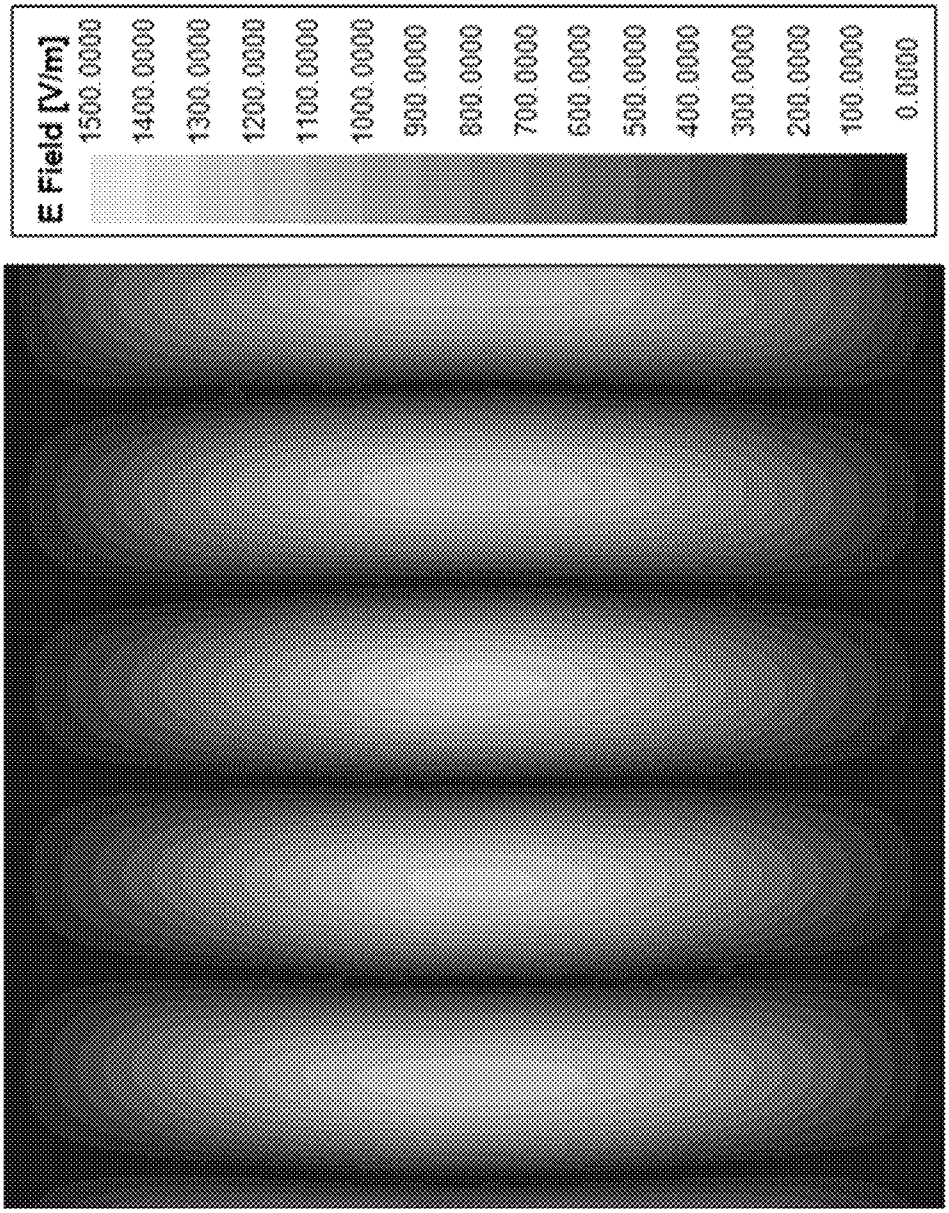
FIG. 8 is a field intensity distribution diagram of a vertical plane 4 when only a second waveguide excitation source 7 works after a static microwave resonant cavity is improved in an embodiment of the present disclosure.
Figure 9:
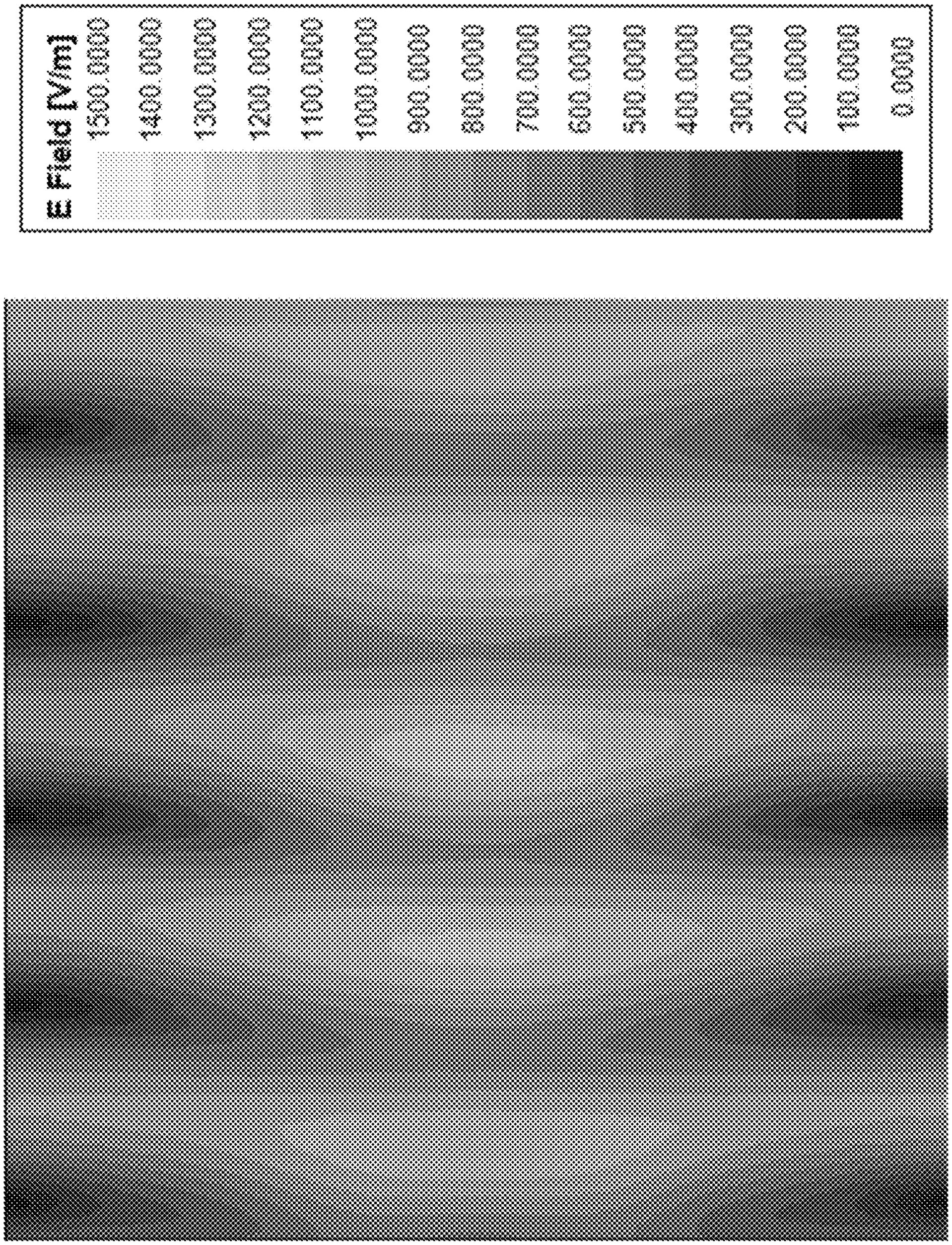
FIG. 9 is a field intensity distribution diagram of a horizontal plane 3 when a first waveguide excitation source 2 and a second waveguide excitation source 7 work simultaneously after a static microwave resonant cavity is improved in an embodiment of the present disclosure.
Figure 10:
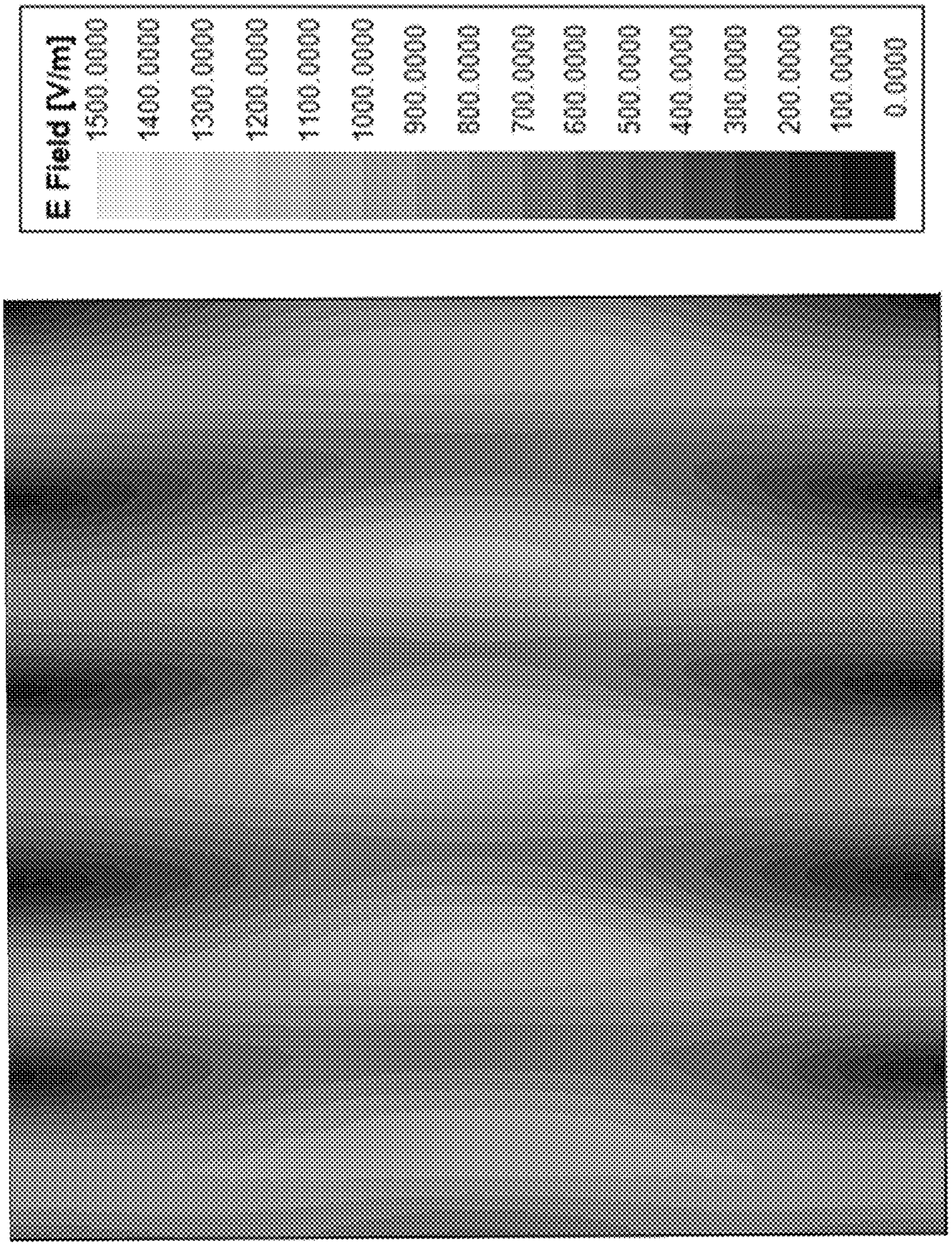
FIG. 10 is a field intensity distribution diagram of a vertical plane 4 when a first waveguide excitation source 2 and a second waveguide excitation source 7 work simultaneously after a static microwave resonant cavity is improved in an embodiment of the present disclosure.

In step 3, the first anisotropic medium and the second anisotropic medium (obtained by rotating the first anisotropic medium around the z-axis by) 90° with the thickness of d=33.5 mm are respectively applied to the two cavity walls by taking the z-direction as a normal direction. The dimension of the resonant cavity in the z-direction is finely adjusted as l=395 mm, so that the resonant cavity, after adding two pieces of anisotropic material, works in two orthogonal modes or two degenerate modes, that is, a $TE_{107}$ mode and a $TE_{017}$ mode. A schematic structural diagram of an improved resonant cavity is shown in FIG. 4. In addition, to better excite the two degenerate modes inside the cavity and observe misalignment of a nodal point and an antinodal point of a standing wave of the two modes in the z-direction, a second waveguide excitation source 7 is added in this embodiment. As shown in FIG. 4, the second waveguide excitation source 7, which looks like the first waveguide excitation source 2 rotated around the z-axis by 90°, is mounted on an opposite surface of the original first waveguide excitation source 2. Field intensity distributions of two orthogonal horizontal planes 3 and 4 slightly smaller than an air area in the cavity are compared to describe the misalignment of the nodal point and the antinodal point of the two degenerate modes and improvement effects of the field intensity distribution uniformity in the cavity. FIG. 5 and FIG. 6 are respectively field intensity distribution diagrams on a horizontal plane 3 and a vertical plane 4 when an improved resonant cavity is only excited by the first waveguide excitation source 2 and a $TE_{107}$ mode works. FIG. 7 and FIG. 8 are respectively field intensity distribution diagrams on a horizontal plane 3 and a vertical plane 4 when an improved resonant cavity is only excited by the second waveguide excitation source 7 and a $TE_{017}$ mode works. Respectively comparing FIG. 5 and FIG. 7, as well as FIG. 6 and FIG. 8, it can be found that a nodal (antinodal) point of the $TE_{107}$ mode excited by the waveguide source 2 nearly overlaps with the antinodal (nodal) point of the $TE_{017}$ mode excited by the waveguide source 7. When the first waveguide excitation source 2 and the second waveguide excitation source 7 excite with equal power simultaneously, and the $TE_{107}$ mode and the $TE_{017}$ mode work simultaneously, field intensity distribution diagrams on a horizontal plane 3 and a vertical plane 4 under the condition that total excitation power of a microwave cavity is unchanged are shown in FIG. 9 and FIG. 10. By comparing the field intensity distribution inside the cavity before improvement, it can be learned that the improved cavity works in two polarized degenerate modes, that is, the $TE_{107}$ mode and the $TE_{017}$ mode, and the nodal (antinodal) points of the two modes in the z-direction are misaligned, that is, the nodal point of one mode overlaps with the antinodal point of the other mode, so that the uniformity of internal field intensity in the z-direction is greatly improved. In addition, the cavity works in the $TE_{107}$ mode and the $TE_{017}$ mode, so the uniformity in the transverse directions u and v is good.

What is claimed is:

1. A method for improving uniformity of an electromagnetic field inside a static microwave resonant cavity, comprising the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction to be consistent, and enabling waveguide with the same dimensions as those of an adjusted resonant cavity in the u-direction and the v-direction to have guided modes polarized in the u-direction and polarized in the v-direction;

step 2, selecting two different types of anisotropic media, so that a phase difference between electromagnetic waves polarized along two orthogonal directions of u and v in the resonant cavity after being totally reflected by the two types of the anisotropic media is $\Delta\varphi_{uv}=(2q+1)\pi$, that is, a difference between numbers of standing waves of two orthogonal modes along the z-direction is an odd number 2q+1, wherein q is an integer; and step 3, respectively arranging the two types of the anisotropic media on two inner walls in the z-direction inside the resonant cavity, and setting a distance between the two types of the anisotropic media to enable the resonant cavity to work in the two orthogonal modes or two degenerate modes, so that a nodal point or an antinodal point of one mode in the z-direction inside the resonant cavity is exactly an antinodal point or a nodal point of the other mode, thereby improving the uniformity of the electromagnetic field.

2. The method according to claim 1, wherein in the step 1, the direction with the most non-uniform electromagnetic field distribution of the three orthogonal directions refers to a direction with a largest number of standing waves or densest standing waves.

3. The method according to claim 1, wherein in the step 1, the two guided modes polarized in the u-direction and the v-direction of the waveguide with the same dimensions as those of the resonant cavity in the u-direction and the v-direction have the same phase constant β, that is, the two guided modes degenerate.

4. The method according to claim 1, wherein in the step 2, the two types of the anisotropic media are arranged inside the resonant cavity perpendicular to and intersecting with each other; and then, the electromagnetic waves are emitted to an interior of the resonant cavity from end portions of the two types of the anisotropic media, and the phase difference $\Delta\varphi_{uv}$ between the electromagnetic waves in the two orthogonal directions of u and v is detected.

5. The method according to claim 1, wherein the step 3 further comprises setting a polarization direction of a feed source of the resonant cavity on an angle bisector of the u-direction and the v-direction, or arranging two feed sources outside the two inner walls, provided with the media, to effectively excite the two orthogonal modes, in which the nodal point in one mode is misaligned with the antinodal point in the other mode in the z-direction inside the cavity.

6. A method for improving uniformity of an electromagnetic field inside a static microwave resonant cavity, comprising the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium and a second anisotropic medium, that are different from each other, so that a phase difference between electromagnetic waves polarized along two orthogonal directions of u and v in the resonant cavity after transmitting through two types of anisotropic media is $\Delta\varphi_{uv}=\beta_{u1}d_1+\beta_{u2}d_2-\beta_{v1}d_1+\beta_{v2}d_2$, wherein $d_1$ and $d_2$ are thicknesses of the two types of the anisotropic media, $\beta_{u1}$ and $\beta_{u2}$ are respectively phase constants of a TE wave or a TM wave (an electric field or a magnetic field polarized along the u-direction) in the waveguide with the same dimensions as those of the resonant cavity in the u-direction is filled with the first anisotropic medium and the second anisotropic medium, and $\beta_{v1}$ and $\beta_{v2}$ are phase constants in the v-direction under the same condition; and step 3, respectively arranging the two types of the anisotropic media on two inner walls in the z-direction inside the resonant cavity, and setting a distance between the two types of the anisotropic media to enable the resonant cavity to work in two orthogonal modes or two degenerate modes, so that a nodal point or an antinodal point of one mode in the z-direction inside the resonant cavity is exactly an antinodal point or a nodal point in the other mode, thereby improving the uniformity of the electromagnetic field.

7. The method according to claim 6, wherein in the step 1, the direction with the most non-uniform electromagnetic field distribution of the three orthogonal directions refers to a direction with a largest number of standing waves or densest standing waves.

8. The method according to claim 6, wherein in the step 1, the two guided modes polarized in the u-direction and the v-direction of the waveguide with the same dimensions as those of the resonant cavity in the u-direction and the v-direction have the same phase constant β, that is, the two guided modes degenerate.

9. The method according to claim 6, wherein in the step 2, the two types of the anisotropic media are arranged inside the resonant cavity perpendicular to and intersecting with each other; and then, the electromagnetic waves are emitted to an interior of the resonant cavity from end portions of the two types of the anisotropic media, and the phase difference $\Delta\varphi_{uv}$ between the electromagnetic waves in the two orthogonal directions of u and v is detected.

10. The method according to claim 6, wherein the step 3 further comprises setting a polarization direction of a feed source of the resonant cavity on an angle bisector of the u-direction and the v-direction, or arranging two feed sources outside the two inner walls, provided with the media, to effectively excite the two orthogonal modes, in which the nodal point in one mode is misaligned with the antinodal point in the other mode in the z-direction inside the cavity.

11. A method for improving uniformity of an electromagnetic field inside a static microwave resonant cavity, comprising the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium, so that a phase difference between a TE wave or a TM wave (an electric field or a magnetic field polarized along the two orthogonal directions of u and v) in the resonant cavity after being totally reflected by the first anisotropic medium with a thickness of 2d is $\Delta\varphi_{uv}=(2q+1)\pi$, wherein q is an integer; and rotating the first anisotropic medium around a z-axis by 90° as a second anisotropic medium, that is, a major axis direction of an index ellipsoid of the first anisotropic medium being consistent with a short axis direction of the second anisotropic medium; and step 3, respectively arranging two types of anisotropic media with a thickness of d on two inner walls in the z-direction inside the resonant cavity, enabling a major axis direction of an index ellipsoid of one anisotropic medium to be consistent with the u-direction, enabling a major axis direction of an index ellipsoid of the other anisotropic medium to be consistent with the v-direction, and setting a distance between the two types of the anisotropic media to enable the resonant cavity to work in two orthogonal modes or two degenerate modes, so that a nodal point or an antinodal point of one mode in the z-direction inside the resonant cavity is exactly an antinodal point or a nodal point in the other mode, thereby improving the uniformity of the electromagnetic field.

12. The method according to claim 11, wherein in the step 2, the first anisotropic medium is arranged inside the resonant cavity, then electromagnetic waves are emitted to an interior of the resonant cavity from an end portion of each anisotropic medium, and the phase difference $\Delta\varphi_{uv}$ of the electromagnetic waves in the two orthogonal directions of u and v is detected.

13. The method according to claim 11, wherein in the step 1, the direction with the most non-uniform electromagnetic field distribution of the three orthogonal directions refers to a direction with a largest number of standing waves or densest standing waves.

14. The method according to claim 11, wherein in the step 1, the two guided modes polarized in the u-direction and the v-direction of the waveguide with the same dimensions as those of the resonant cavity in the u-direction and the v-direction have the same phase constant β, that is, the two guided modes degenerate.

15. The method according to claim 11, wherein the step 3 further comprises setting a polarization direction of a feed source of the resonant cavity on an angle bisector of the u-direction and the v-direction, or arranging two feed sources outside the two inner walls, provided with the media, to effectively excite the two orthogonal modes, in which the nodal point in one mode is misaligned with the antinodal point in the other mode in the z-direction inside the cavity.

16. A method for improving uniformity of an electromagnetic field inside a static microwave resonant cavity, comprising the following steps:

step 1, determining a working mode inside a cavity according to electromagnetic field distribution inside a resonant cavity, selecting a direction with most non-uniform electromagnetic field distribution of three orthogonal directions of the resonant cavity as a direction to be improved, denoting as a z-direction, and respectively denoting another two orthogonal directions as a u-direction and a v-direction; then, adjusting dimensions of the resonant cavity in the u-direction and the v-direction, and enabling waveguide with the same dimensions as those of an adjusted resonant cavity in the u-direction and the v-direction to have guided modes polarized in the u-direction and polarized in the v-direction;

step 2, selecting a first anisotropic medium, so that a phase difference between a TE wave or a TM wave (an electric field or a magnetic field polarized along the two orthogonal directions of u and v) in the resonant cavity after passing through the first anisotropic medium with a thickness of 2d is $\Delta\varphi_{uv}=2d\beta_u-2d\beta_v$, wherein q is an integer, $\beta_u$ is a phase constant of the TE wave or the TM wave in the waveguide with the same dimension as that of the adjusted resonant cavity in the u-direction is filled with the first anisotropic medium, and $\beta_v$ is a corresponding phase constant in the v-direction; and rotating the first anisotropic medium around a z-axis by 90° as a second anisotropic medium, that is, a major axis direction of an index ellipsoid of the first anisotropic medium being consistent with a short axis direction of the second anisotropic medium; and step 3, respectively arranging two types of anisotropic media on two inner walls in the z-direction inside the resonant cavity, enabling a major axis direction of an index ellipsoid of one anisotropic medium to be consistent with the u-direction, enabling a major axis direction of an index ellipsoid of the other anisotropic medium to be consistent with the v-direction, and setting a distance between the two types of the anisotropic media to enable the resonant cavity to work in two orthogonal modes or two degenerate modes, so that a nodal point or an antinodal point of one mode in the z-direction inside the resonant cavity is exactly an antinodal point or a nodal point in the other mode, thereby improving the uniformity of the electromagnetic field.

17. The method according to claim 16, wherein in the step 1, the direction with the most non-uniform electromagnetic field distribution of the three orthogonal directions refers to a direction with a largest number of standing waves or densest standing waves.

18. The method according to claim 16, wherein in the step 1, the two guided modes polarized in the u-direction and the v-direction of the waveguide with the same dimensions as those of the resonant cavity in the u-direction and the v-direction have the same phase constant β, that is, the two guided modes degenerate.

19. The method according to claim 16, wherein in the step 2, the first anisotropic medium is arranged inside the resonant cavity, then electromagnetic waves are emitted to an interior of the resonant cavity from an end portion of each anisotropic medium, and the phase difference $\Delta\varphi_{uv}$ of the electromagnetic waves in the two orthogonal directions of u and v is detected.

20. The method according to claim 16, wherein the step 3 further comprises setting a polarization direction of a feed source of the resonant cavity on an angle bisector of the u-direction and the v-direction, or arranging two feed sources outside the two inner walls, provided with the media, to effectively excite the two orthogonal modes, in which the nodal point in one mode is misaligned with the antinodal point in the other mode in the z-direction inside the cavity.

* * * * *